United States Patent [19]
Grassens et al.

[11] Patent Number: 5,768,035
[45] Date of Patent: Jun. 16, 1998

[54] METHOD AND APPARATUS FOR ALIGNING AN OBJECTIVE LENS

[76] Inventors: Leonardus J. Grassens, 19115 Pebble Beach Way, Monument, Colo. 80132; Hollis O'Neal Hall, II, 2935 Leoti Dr., Colorado Springs, Colo. 80922

[21] Appl. No.: 475,240

[22] Filed: Jun. 7, 1995

Related U.S. Application Data

[62] Division of Ser. No. 410,698, Apr. 7, 1995.

[51] Int. Cl.$^6$ .................................................. G02B 7/02
[52] U.S. Cl. ...................... 359/822; 359/818; 359/819
[58] Field of Search ................................ 359/822, 819, 359/813, 814, 823, 824, 818

[56] References Cited

U.S. PATENT DOCUMENTS

| | | | |
|---|---|---|---|
| 2,771,003 | 11/1956 | Lyndall et al. | 88/39 |
| 5,075,977 | 12/1991 | Rando | 33/227 |
| 5,132,944 | 7/1992 | Berg | 369/13 |
| 5,313,332 | 5/1994 | Schell et al. | 359/813 |
| 5,347,500 | 9/1994 | Eguchi | 369/44.14 |
| 5,493,546 | 2/1996 | Kasahara | 369/44.15 |
| 5,532,989 | 7/1996 | Getreuer et al. | 369/44.15 |
| 5,687,033 | 11/1997 | Futagawa et al. | 359/824 |

*Primary Examiner*—Georgia Y. Epps
*Assistant Examiner*—Ricky Mack
*Attorney, Agent, or Firm*—Ronald J. Clark; Robert T. Braun; Donald Bollella

[57] ABSTRACT

An apparatus is described for mounting an actuator lens within an optical disc carriage held by a baseplate assembly. The apparatus includes a frame, a cradle assembly mounted to the frame with at least one degree of freedom of motion, a tower assembly mounted to the frame, a lever assembly rotatably mounted to the frame, and a gripper assembly mounted to the lever assembly. The cradle assembly includes a baseplate alignment assembly having a source of radiant energy for projecting a beam of radiant energy, means for determining the tilt alignment of the beam with respect to the tower assembly, and a plurality of tilt actuators for aligning the tilt of the beam with respect to the tower assembly. The tower assembly includes a video camera having a camera lens, a tower magnifying lens, and a monitor for displaying a presentation of a beam of radiant energy passing through the tower magnifying lens and into the video camera. A method for mounting a lens is described which includes the steps of placing a lens in the carriage, aligning the lens by moving a baseplate assembly with respect to the tower assembly, moving the objective lens assembly with respect to the tower assembly, and moving the actuator lens with respect to the tower assembly. The lens is attached to the gripper assembly and the lever moves the gripper and lens away from the carriage. Adhesive is applied to the carriage and the lever is moved back so as to place the lens on the adhesive in the aligned position.

28 Claims, 7 Drawing Sheets

1

METHOD AND APPARATUS FOR ALIGNING AN OBJECTIVE LENS

This is a division of application Ser. No. 08/410,698, filed Apr. 7, 1995.

BACKGROUND OF THE INVENTION

1. Field of the Invention

This invention relates to manufacturing of optical systems, and, in particular, to the manipulation and alignment of an objective lens during manufacture of an optical system.

2. Description of the Related Art

In the manufacture of prior optical systems, specific alignment of the objective lens with respect to a storage medium was not critical. In those systems, a spindle which holds the storage medium is aligned with respect to guide rails. A carriage rides along the guide rails, and the objective lens is placed within the carriage. Because of the information storage densities used in such optical systems were sufficiently low, and because manufacturing tolerances of the spindle, rails, and objective lens were sufficiently high, specific alignment of the objective lens was not necessary. The objective lens was placed, then tested for alignment within tolerable limits.

Another example of a prior optical system does perform active alignment of the objective lens. However, the objective lens is fixedly mounted to an actuator, and the objective lens/actuator combination is aligned with respect to a carriage assembly. Once aligned with respect to the carriage assembly, the actuator is mounted to the carriage assembly, which is aligned with respect to the storage medium. This prior optical system requires that the actuator be alignable with respect to the carriage assembly. Additionally, the actuator/carriage assembly combination is quite large relative to such assemblies in other optical systems.

SUMMARY OF THE INVENTION

As information storage densities increase, the alignment between the objective lens and the storage medium becomes more critical. As a result, either stricter manufacturing tolerances or improved alignment of the objective lens is necessary. Because stricter manufacturing tolerances increase manufacturing cost significantly, improved alignment of the objective lens allows higher information storage densities at an economically feasible cost.

An apparatus is described which aligns such an objective lens. The apparatus comprises a frame, a cradle assembly mounted to the frame with at least one degree of freedom of motion, a tower assembly mounted to the frame, a lever assembly rotatably mounted to the frame, and a gripper assembly mounted to the lever assembly. The cradle assembly includes a baseplate alignment assembly comprising a source of radiant energy for projecting a beam of radiant energy, means for determining the tilt alignment of the beam with respect to the tower assembly, and a plurality of tilt actuators for aligning the tilt of the beam with respect to the tower assembly. The baseplate alignment assembly may further comprise means for determining the lateral alignment of the beam with respect to the tower assembly and a plurality of lateral actuators for aligning the beam laterally with respect to the tower assembly. The tower assembly comprises a video camera having a camera lens, a tower magnifying lens, and a monitor for displaying a representation of a beam of radiant energy passing through the tower magnifying lens and into the video camera.

The gripper assembly comprises an objective lens assembly, a gripper objective lens mounted to the objective lens assembly, an objective lens alignment assembly for aligning the gripper objective lens with respect to the tower assembly and the cradle assembly, and an actuator lens tilt assembly for aligning the objective lens with respect to the tower assembly and the cradle assembly. The objective lens assembly further comprises a housing having an opening at one end for receiving an objective lens and a bellows structure on its surface to allow bending of the housing, a gripper objective lens, a non-opaque substrate mounted within the housing, and a pneumatic tube attached to the housing for creating a pressure differential between the interior and the exterior of the housing sufficient to hold the actuator lens against the opening. The objective lens alignment assembly further comprises an assembly support, a first lateral alignment support slidably mounted to the assembly support, a first lateral actuator for positioning the first lateral alignment support, a second lateral alignment support slidably mounted to the first lateral alignment support, a second lateral actuator for positioning the second lateral alignment support, a support frame having a frame base and a frame extension, mounted to the second lateral actuator, a support leaf spring mounted to the support frame and biasing the housing against the frame extension, and a focus actuator for positioning the frame extension with respect to the frame base. The actuator lens tilt assembly further comprises a flexure support ring; two flexure support plates; four flexure plates mounted at equal intervals around the flexure support ring, two of which are mounted to the housing and two of which are mounted to the flexure support plates; a first lever disposed against a flexure plate; a first tilt actuator mounted against the first lever for imparting motion on the first lever which is translated into rotational motion by the flexure support ring, the flexure support plates, and the flexure plates; a second lever disposed against a flexure plate; and a second tilt actuator mounted against the second lever for imparting motion on the second lever which is translated into rotational motion by the flexure support ring, the flexure support plates, and the flexure plates.

A method for aligning an actuator lens is described comprising the steps of moving a baseplate assembly with respect to the tower assembly, moving the objective lens assembly with respect to the tower assembly, and moving the actuator lens with respect to the tower assembly. The step of moving the baseplate assembly further comprises moving the baseplate assembly laterally with respect to the tower assembly and rotating the baseplate assembly with respect to the tower assembly. The step of moving the actuator lens further comprises moving the actuator lens laterally with respect to the tower assembly and rotating the actuator lens with respect to the tower assembly. Such a method may be used with the above-described apparatus.

For a better understanding of these and other objects of the present invention, reference is made to the detailed description of the invention which is to be read in conjunction with the following drawings, wherein:

DESCRIPTION OF THE PREFERRED EMBODIMENT

Figure 1:
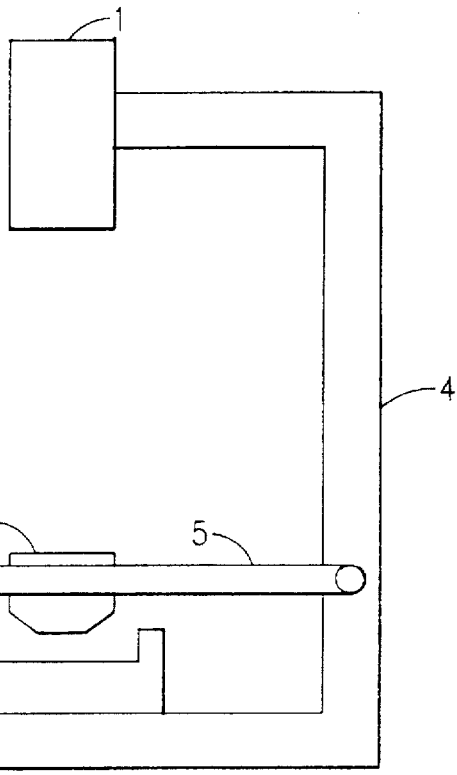
FIG. 1 is a generalized side view of one embodiment of the invention, showing the gripper assembly in a closed position.
Figure 2:
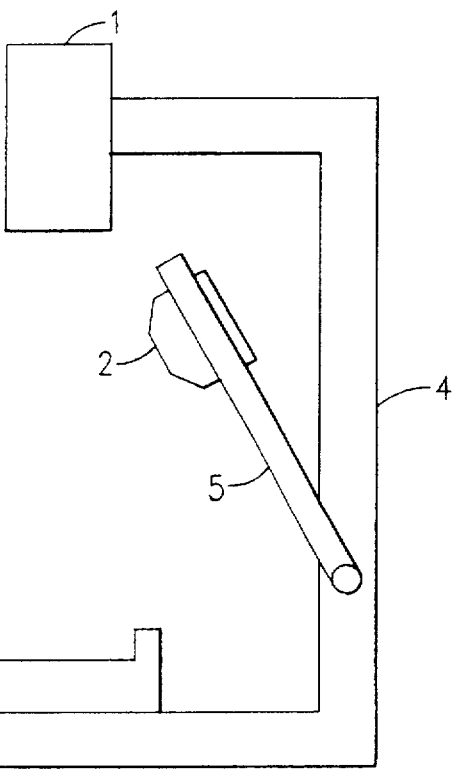
FIG. 2 is a generalized side view of one embodiment of the invention, showing the gripper assembly in an open position.

Referring to exemplary FIGS. 1 and 2, according to one aspect of the invention, the apparatus comprises a tower assembly 1, a gripper assembly 2, and a cradle assembly 3. The tower assembly 1 is fixedly mounted to a frame 4. The tower assembly 1 defines a tower axis. The gripper assembly 2 is fixedly mounted to a lever assembly 5, which is rotatably mounted to the frame 4. The cradle assembly 3 is mounted to the frame 4 with at least one degree of freedom of motion. A line between the tower assembly 1 and the cradle assembly 3 is referred to as an assembly axis. In the closed position, as shown in FIG. 1, the gripper assembly 2 is between the tower assembly 1 and the cradle assembly 3 along the assembly axis. In the open position, as shown in FIG. 2, the gripper assembly 2 is not along the assembly axis.

Figure 3:
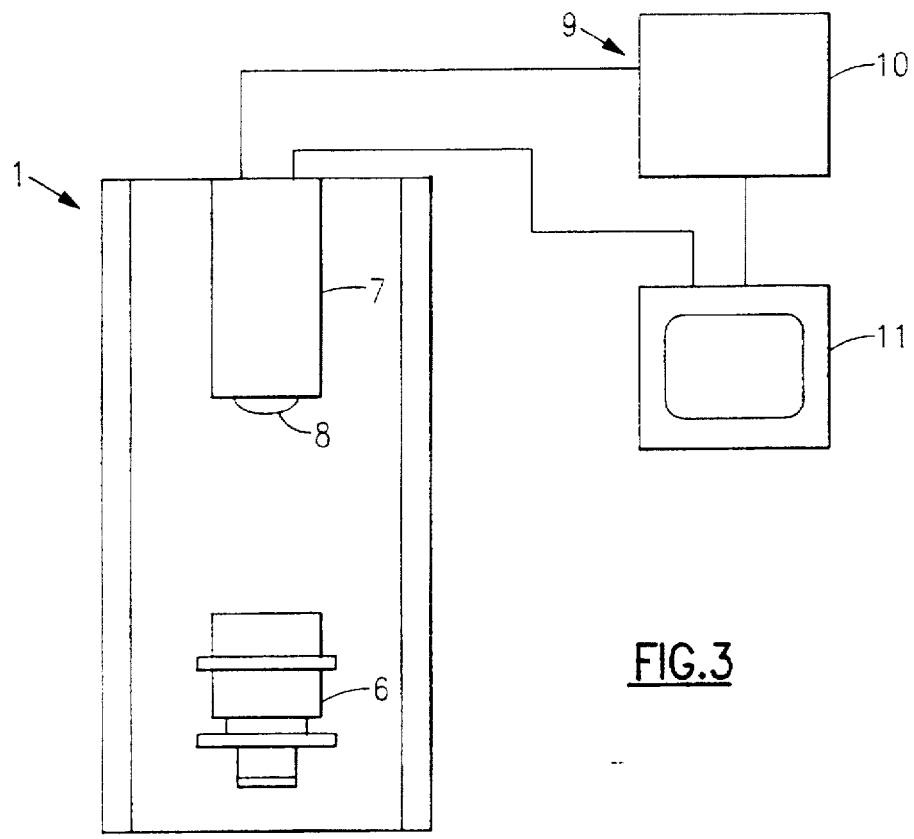
FIG. 3 is a cross-sectional view of the tower assembly, including an embodiment of the analysis assembly.

Referring to exemplary FIG. 3, a cross-section of the tower assembly 1 is shown in more detail. The tower assembly 1 comprises a tower magnifying lens 6 and a video camera 7 having a camera lens 8. The optical axes of the camera lens 8 of the video camera 7 and the tower magnifying lens 6 are the same, and are referred to collectively as the tower optical axis. The output from the video camera 7 is connected to an analysis assembly 9. The analysis assembly 9 may be any assembly suitable for analyzing the characteristics of a radiant beam of energy. In the embodiment shown in exemplary FIG. 3, the analysis assembly 9 comprises a processor 10 and a monitor 11.

Figure 4:
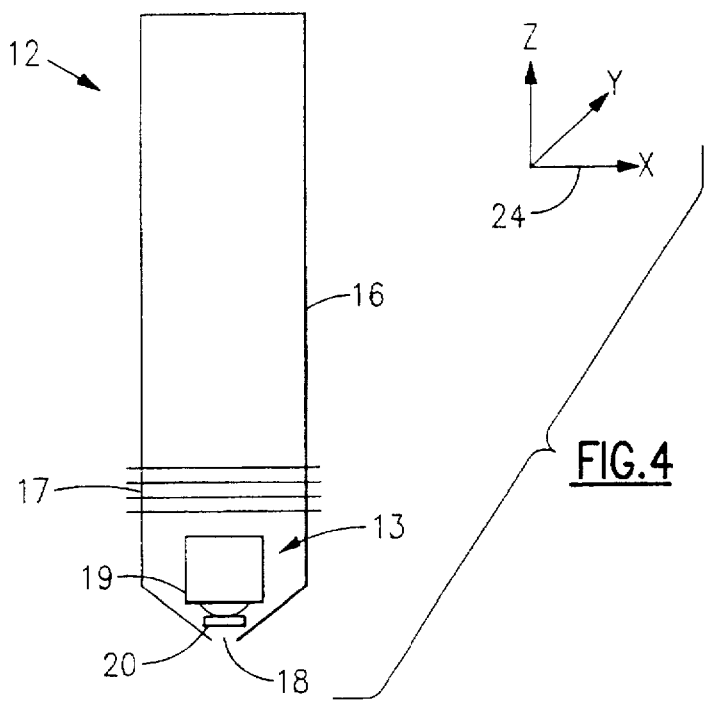
FIG. 4 is a cross-section view of the vacuum chuck and the microscope objective lens assembly.
Figure 5:
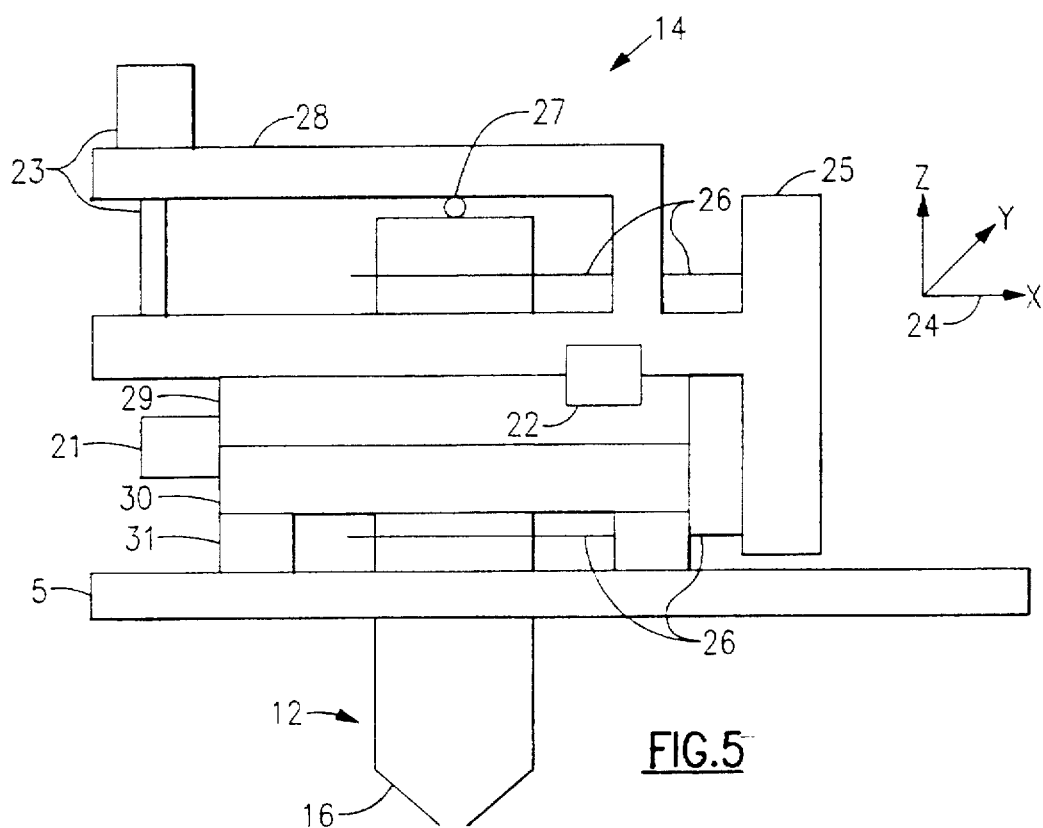
FIG. 5 is a view of the microscope objective lens alignment assembly.
Figure 6:
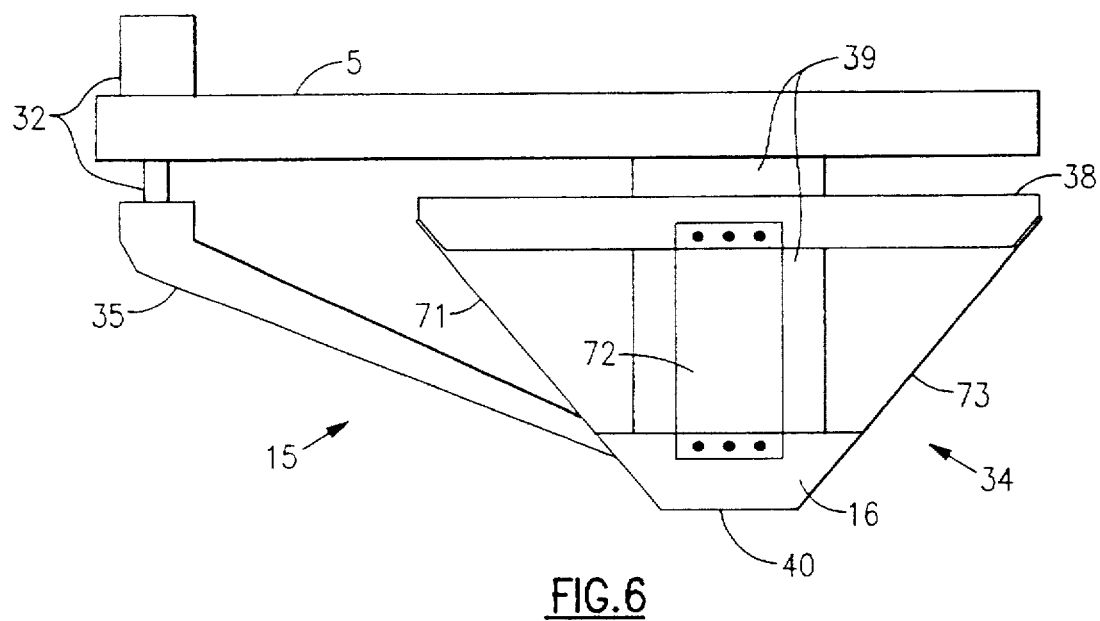
FIG. 6 is a side view of the actuator lens tilt assembly.
Figure 7:
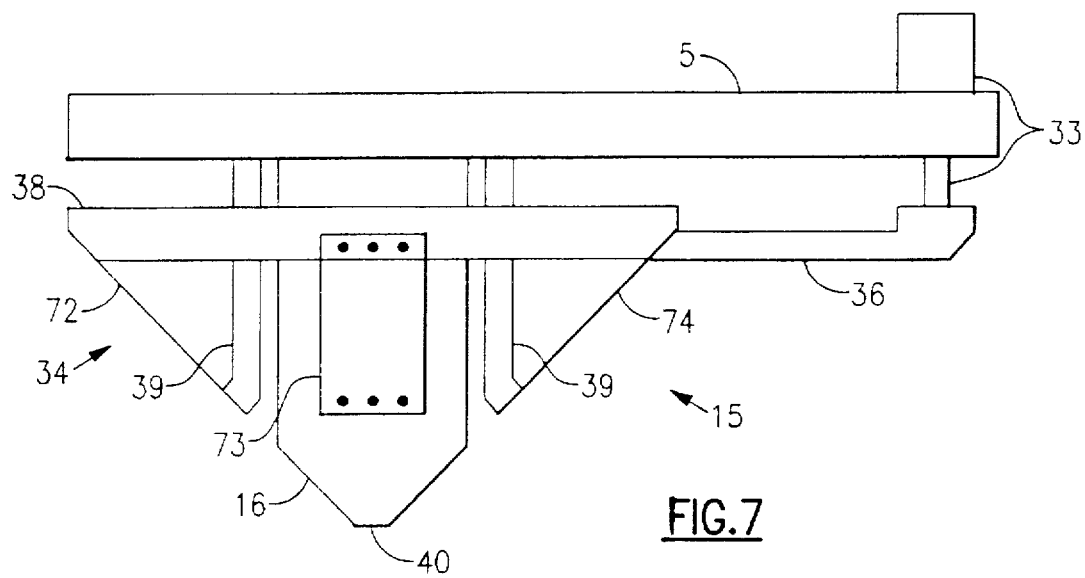
FIG. 7 is a front view of the actuator lens tilt assembly.

Referring to exemplary FIGS. 4, 5, 6 and 7, the gripper assembly 2 comprises a vacuum chuck 12, a microscope objective lens assembly 13, a microscope objective lens alignment assembly 14, and an actuator lens tilt assembly 15. FIG. 4 shows a cross-sectional view of one embodiment of the vacuum chuck 12 and the microscope objective lens assembly 13. FIG. 5 shows a view of one embodiment of the microscope objective lens alignment assembly 14. FIGS. 6 and 7 show two views of the actuator lens tilt assembly 15.

Referring to exemplary FIG. 4, the vacuum chuck 12 comprises a housing 16, a bellows structure 17, and an actuator lens receiving opening 18. A pneumatic tube (not shown) is connected to the housing 16. In operation, an actuator lens (not shown) is placed within the actuator lens receiving opening 18 such that the actuator lens receiving opening 18 is completely covered. The actuator lens may be an objective lens. Air is then evacuated from the housing 16 through the pneumatic tube (not shown) to create a pressure differential between the interior and the exterior of the housing 16. This pressure differential operates to hold the actuator lens against the actuator lens receiving opening 18 when the gripper assembly 2 moves. The housing 16 contains a bellows structure 17 to allow the housing 16 to bend while maintaining a pressure differential.

The microscope objective lens assembly 13 comprises a microscope objective lens 19 and a substrate 20. In operation, a beam of radiant energy will enter the housing 16 through the actuator lens receiving opening 18 and, if present, through the actuator lens. The beam will pass through the substrate 20 and through the microscope objective lens 19. The beam then passes through the housing 16 and into the tower assembly 1, where it passes through the tower magnifying lens 6 and is received by the video camera 7. Together, the microscope objective lens 19 and the tower magnifying lens 6 magnify the beam and focus the beam in the video camera 7. The tower magnifying lens 6 may be a tube lens. The substrate 20 simulates the optical properties of an information-bearing disk, and the effects of those properties on the beam. The substrate 20 is mounted such that, when the gripper assembly 2 is in the closed position, the substrate 20 is orthogonal to the tower optical axis.

Referring to exemplary FIG. 5, the microscope objective lens alignment assembly 14 comprises an X-axis lateral alignment actuator 21, a Y-axis lateral alignment actuator 22, and a focus actuator 23. Referring to exemplary FIG. 5, there is shown a reference coordinate system 24. This reference coordinate system 24 is chosen for purposes of explanation only, and it will be obvious to one skilled in the art that any convenient coordinate system could be chosen without departing from the spirit and scope of the present invention.

In the embodiment particularly shown in FIG. 5, a microscope support frame 25 having a frame extension 28 supports the housing 16 by a support leaf spring 26. The support leaf spring 26 biases the housing 16 against a cylindrical bearing 27 located between the housing 16 and a frame extension 28. The focus actuator 23 is mounted to the frame extension 28, and maintains a distance between the frame extension 28 and the microscope support frame 25 along the Z-axis, as indicated by the reference coordinate system 24. Motion of the housing 16 along the Z-axis adjusts the focus of the microscope objective lens 19 in combination with the tower magnifying lens 6.

The microscope support frame 25 is mounted on a Y-axis lateral alignment support 29 such that the microscope support frame 25 may slide relative to the Y-axis lateral alignment support 29 along the Y-axis, as indicated by the reference coordinate system 24. The Y-axis lateral alignment actuator 22 is mounted to the microscope support frame 25, and will actuate the relative sliding motion along the Y-axis.

The Y-axis lateral alignment support 29 is mounted on an X-axis lateral alignment support 30 such that the Y-axis lateral alignment support 29 may slide relative to the X-axis lateral alignment support 30 along the X-axis, as indicated by the reference coordinate system 24. The X-axis lateral alignment actuator 21 is mounted to the Y-axis lateral alignment support 29, and will actuate the relative sliding motion along the X-axis.

The X-axis lateral alignment support 30 is mounted to a lateral alignment assembly support 31. The lateral alignment assembly support 31 is mounted to the lever assembly 5. It will be apparent to one skilled in the art that the mountings between the microscope support frame 25, the Y-axis lateral alignment support 29, the X-axis lateral alignment support 30, and the lateral alignment assembly support 31 may be rearranged from the above description without departing from the spirit and scope of the present invention.

Referring to exemplary FIGS. 6 and 7, there are shown two views of the actuator lens tilt assembly 15. FIG. 6 represents a left side view of the actuator lens tilt assembly 15 according to one aspect of the invention. FIG. 7 represents a front view of the same actuator lens tilt assembly 15. The actuator lens tilt assembly 15 comprises an X-axis tilt actuator 32, a Y-axis tilt actuator 33, and a flexure assembly 34. The X-axis tilt actuator 32 is mounted to the lever assembly 5 and against an X-axis lever 35. The X-axis lever 35, at the end nearest the X-axis tilt actuator 32, is biased against the lever assembly 5, and at the other end is mounted to the flexure assembly 34. The Y-axis tilt actuator 33 is mounted to the lever assembly 5 and against a Y-axis lever 36. The Y-axis lever 36, at the end nearest the Y-axis tilt actuator 33, is biased against the lever assembly 5, and at the other end is mounted to the flexure assembly 34.

The flexure assembly 34 comprises a plurality of flexure plates 37-1, 37-2, 37-3, 37-4, a flexure support ring 38, and a plurality of flexure support plates 39. Flexure plate 37-1 is mounted at one end to the flexure support ring 38, and mounted at its other end to the X-axis lever 35 and the housing 16. Flexure plate 37-3 is mounted opposite flexure plate 37-1 to the flexure support ring 38 and to the housing 16. Flexure plate 37-4 is mounted at one end to the Y-axis lever 36 and the flexure support ring 38, and mounted at its other end to a flexure support plate 39. Flexure plate 37-4 is mounted at a 90 degree interval from both flexure plate 37-1 and flexure plate 37-3. Flexure plate 37-2 is mounted opposite flexure plate 37-2 to the flexure support ring 38 and to a flexure support plate 39. The flexure support plates 39 are mounted to the lever assembly 5.

Flexure plates 37-1, 37-2, 37-3, 37-4 each lie in a separate plane. The planes in which flexure plates 37-1 and 37-3 lie intersect along a line through an intersection point 40. The planes in which flexure plates 37-2 and 37-4 lie intersection along a line through the intersection point 40. The lines may be orthogonal to each other.

The operation of the actuator lens tilt assembly 15 will be described with respect to a downward motion imparted on each of the tilt actuators, the X-axis tilt actuator 32 and the Y-axis tilt actuator 33.

A downward motion of the X-axis tilt actuator 32 imparts a downward motion on the X-axis lever 35. This downward force produces a counterclockwise rotational force on flexure plate 37-1 about the point where flexure plate 37-1 is mounted to the flexure support ring 38. The downward force also translates into a counterclockwise rotational force on flexure plate 37-3 about the point where flexure plate 37-3 is mounted to the flexure support ring 38. These two rotational forces cause rotation about the intersection of the two planes in which the flexure plates 37-1, 37-3 lie. This intersection occurs at intersection point 40.

A downward motion of the Y-axis tilt actuator 33 imparts a downward force on the Y-axis lever 36. This downward force produces a clockwise rotational force on flexure plate 37-4 about the point where flexure plate 37-4 is mounted to the flexure support plate 39. Because of the rigidity of the flexure support ring 38, this rotational force translates into a clockwise rotational force on flexure plate 37-2 about the point where flexure plate 37-2 is mounted to the flexure support plate 39. These two rotational forces cause rotation about the intersection of the two planes in which the flexure plates 37-2 and 37-4 lie. This intersection occurs at intersection point 40.

Figure 8:
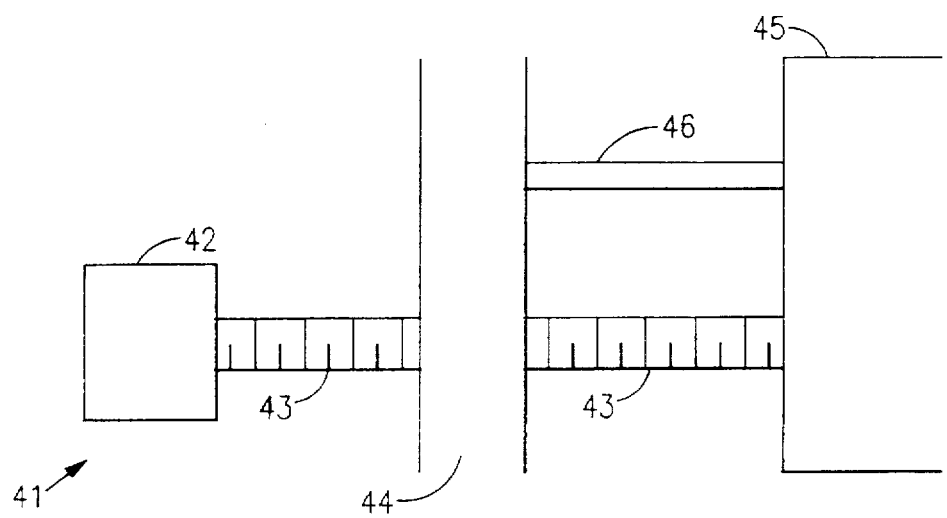
FIG. 8 is a view of an alignment actuator.

Referring to exemplary FIG. 8, there is shown one embodiment of an alignment actuator 41. The alignment actuator 41 may be a tilt actuator or a lateral alignment actuator, as described above. The alignment actuator 41 contains a handle 42 and a threaded body 43. The threaded body 43 is threadably mounted through a fixed surface 44 and against a movable surface 45. The movable surface 45 is biased toward the fixed surface 44 by a spring 46 or other suitable biasing means. The mounting of the movable surface 45 determines whether the force by the alignment actuator 41 or the biasing by the spring 46 produces a lateral or rotational force. The alignment actuator 41 may include what is commonly referred to as a micrometer stage.

Figure 9:
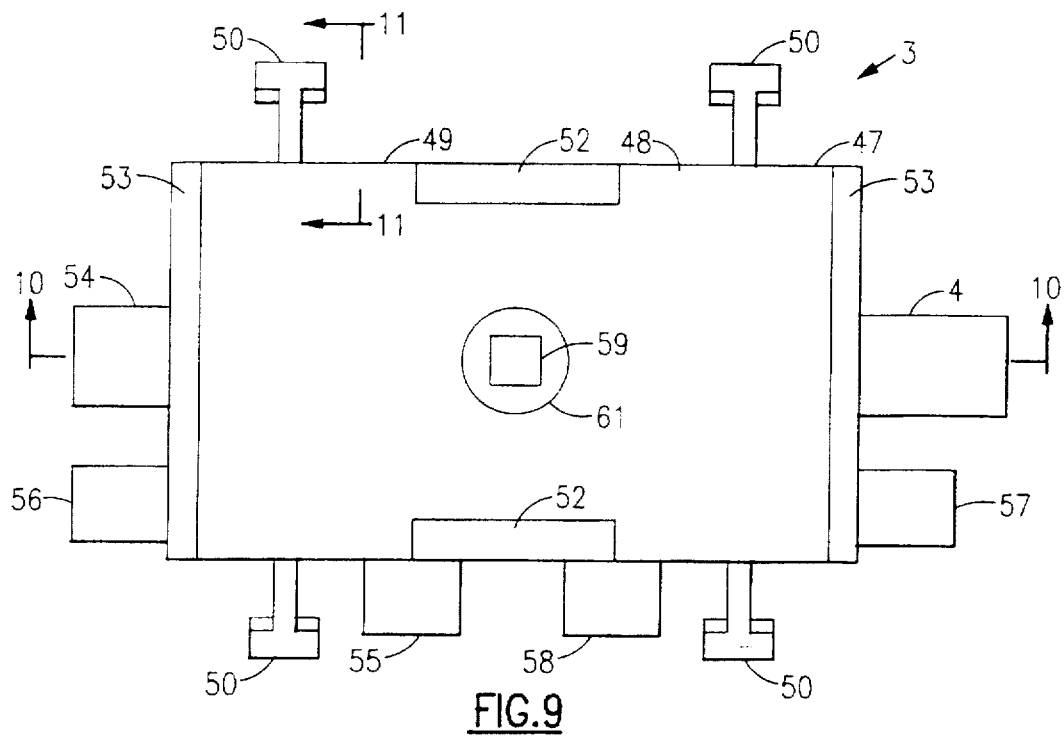
FIG. 9 is a top view of one embodiment of the cradle assembly.
Figure 10:
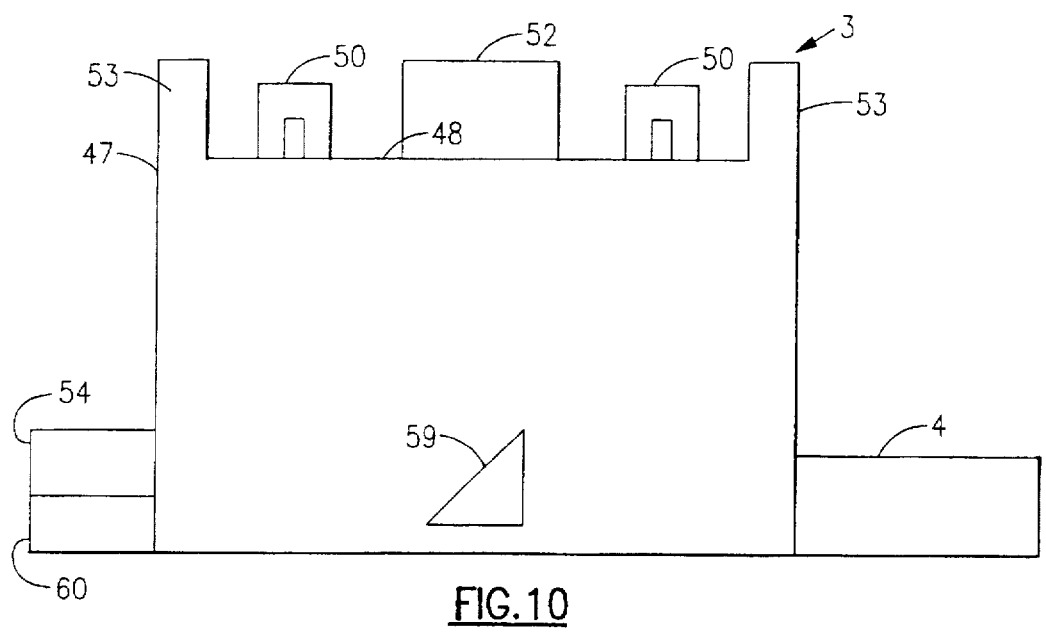
FIG. 10 is a cross-sectional view of one embodiment of the cradle assembly, taken along line 10—10 of FIG. 9.

Referring to exemplary FIG. 9, there is shown a top view of the cradle assembly 3. Referring to exemplary FIG. 10, there is shown a cross-sectional view of the cradle assembly 3, taken along line 10—10 of FIG. 9. The cradle assembly 3 comprises a cradle 47 having a surface 48 and a side 49, a plurality of vacuum clamps 50, and a baseplate alignment assembly (not shown). The cradle includes side walls 52 and end walls 53 for securing a baseplate assembly (not shown) in the cradle 47. In the embodiment particularly shown in exemplary FIGS. 9 and 10, the baseplate alignment assembly (not shown) comprises a source of radiant energy 54, a Y-axis source lateral actuator 55, a Z-axis source lateral actuator 56, an X-axis cradle assembly tilt actuator 57, a Y-axis cradle assembly tilt actuator 58, a mirror 59, and an alignment analyzer 60. In another embodiment, the baseplate alignment assembly (not shown) comprises a source of radiant energy 54, an X-axis cradle assembly tilt actuator 57, a Y-axis cradle assembly tilt actuator 58, a mirror 59, and an alignment analyzer 60. In both embodiments, the mirror 59 is aligned below a hole 61 in the surface 48 of the cradle 47. Additionally, the source of radiant energy 54 and the alignment analyzer 60 may be combined in an auto-collimater or an auto-collimater/telescope.

Figure 11:
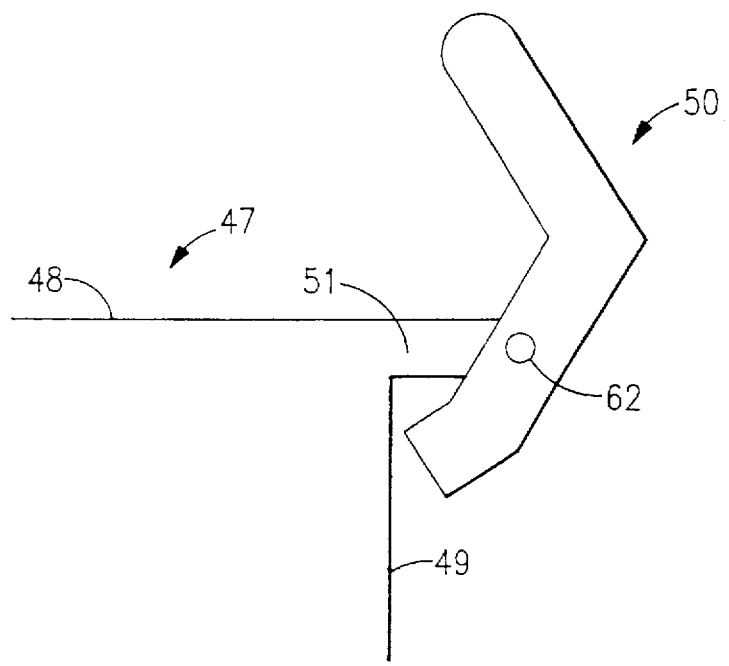
FIG. 11 is a cross-sectional view of one embodiment of a vacuum clamp in the open position, taken along line 11—11 of FIG. 9.
Figure 12:
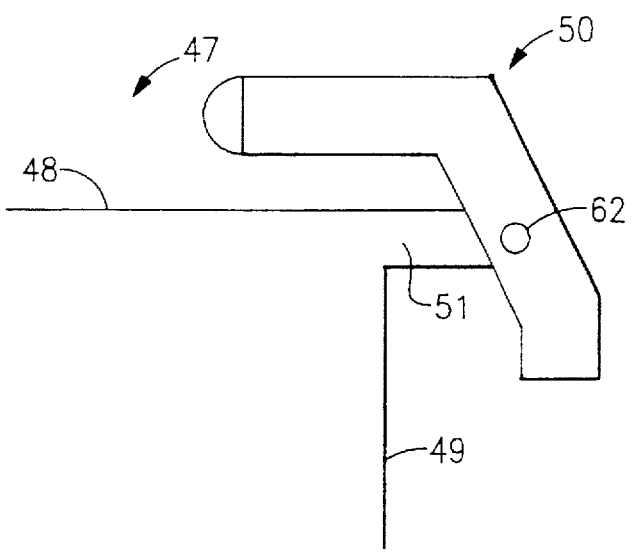
FIG. 12 is a cross-sectional view of one embodiment of a vacuum clamp in the closed position, taken along line 11—11 of FIG. 9.

Referring to exemplary FIG. 11, a cross-sectional view of a vacuum clamp 50 is shown in the open position. Exemplary FIG. 12 shows a cross-sectional view of a vacuum clamp 50 in the closed position. The surface 48 of the cradle 47 extends laterally beyond the side 49 of the cradle 47. A vacuum clamp 50 with a U-shaped cross-section is placed over the extension of the cradle 47, with one leg of the U-shape on each side of the extension. A pivot pin 62 is placed through each leg of the U-shape and through the extension of the cradle 47. In the open position, a baseplate assembly can be placed on the cradle 47. Once in place, a pneumatic tube (not shown) biases the vacuum clamp 50 to the closed position, securing the baseplate against movement.

Figure 13:
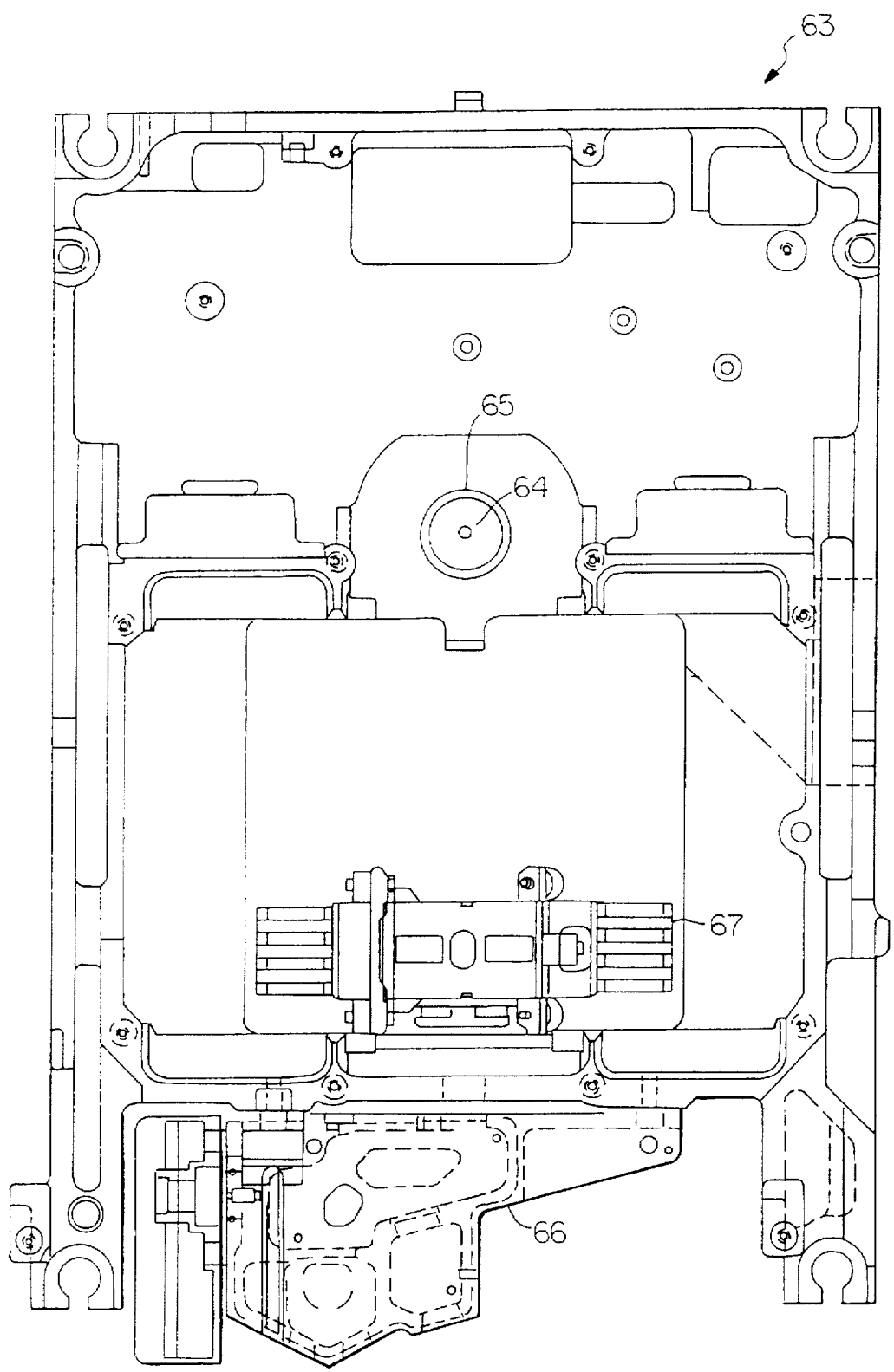
FIG. 13 is a top view of a baseplate assembly.

In operation, as shown in exemplary FIG. 13, a baseplate assembly 63 is provided. The baseplate assembly 63 contains a spindle 64 and a spindle motor 65 for rotating an information-bearing disk, and a spindle servo (not shown) for controlling the speed of the spindle motor 65. The baseplate assembly 63 further contains an optics module assembly 66. The baseplate assembly 63 also contains a carriage motor (not shown) and a carriage assembly 67 for directing a beam of radiant energy from the optics module assembly 66 toward a position on the information-bearing disk, and a carriage control servo (not shown) for controlling the position of the carriage assembly. At this point, the carriage assembly 67 does not contain an actuator lens for focussing the beam of radiant energy on the information-bearing disk. The carriage assembly 67 may be held in place relative to the spindle 64 by a carriage stop (not shown).

The baseplate assembly 63 is placed on the surface 48 of the cradle 47 and secured with the vacuum clamps 50. A test disk of glass or other suitable material (not shown) is placed on the spindle of the baseplate assembly 63. The gripper assembly 2 is then lowered into the closed position.

The source of radiant energy 54 radiates two cradle alignment beams of radiant energy toward the mirror 59. The first cradle alignment beam is reflected from the mirror 59, then passes through the hole 61 in the cradle 47 and through the baseplate assembly 63. The first cradle alignment beam reflects off the test disk and is received by the alignment analyzer 60. The second cradle alignment beam is reflected from the mirror 59, then passes through the hole 61 in the cradle 47 and through the baseplate assembly 63. The second cradle alignment beam reflects off the substrate 20 and is received by the alignment analyzer 60. By analyzing the relative positions of the first and second cradle alignment beams, the alignment analyzer 60 determines the tilt of the test disk with respect to the substrate 20. It will be obvious that the mirror 59 may comprise two parallel mirrors, each reflecting one of the cradle alignment beams.

Tilt between the test disk and the substrate 20 is corrected in the following manner. The X-axis cradle assembly tilt actuator 57 tilts the cradle assembly 3 about the X-axis. The Y-axis cradle assembly tilt actuator 58 tilts the cradle assembly 3 about the Y-axis. Acting together, the cradle assembly tilt actuators 57, 58 tilt the cradle assembly 3, including the test disk, with respect to the substrate 20. Because the substrate 20 is orthogonal to the tower optical axis, this action tilts the cradle assembly 3 with respect to the tower optical axis. Each of the actuators 57, 58 may be an alignment actuator 41 as shown in exemplary FIG. 8.

In one embodiment, lateral alignment of the cradle assembly 3 with respect to the tower optical axis is done mechanically, and is not tested or measured. In another embodiment, if the cradle alignment beam is not received by the alignment analyzer 60, or is off-center when received by the alignment analyzer 60, the position of the source of radiant energy 54 can be moved using the Y-axis source lateral actuator 55 and the Z-axis source lateral actuator 56. As shown best in FIG. 9, the mirror 59 is situated such that a change in the position of the source of radiant energy 54 along the Y-axis is translated into a change in the position of the cradle alignment beam along the Y-axis as it is received by the alignment analyzer 60. The Y-axis source lateral actuator 55 effects this change in position. Similarly, a change in the position of the source of radiant energy 54 along the Z-axis is translated into a change in the position of the cradle alignment beam along the X-axis as it is received by the alignment analyzer 60. The Z-axis source lateral actuator 56 effects this change in position. Each of the actuators 55, 56 may be an alignment actuator 41 as shown in exemplary FIG. 8.

In the embodiment particularly described below, all references to a coordinate system are made in accordance with reference coordinate system 24 shown in exemplary FIG. 5. This reference coordinate system 24 is chosen for purposes of explanation only, and it will be obvious to one skilled in the art that any convenient coordinate system could be chosen without departing from the spirit and scope of the present invention.

Once aligned, the source of radiant energy 54 is turned off and the test disk is removed. If not previously aligned, the carriage assembly of the baseplate assembly 63 is moved in approximate alignment with the assembly axis, and an actuator lens is placed within the carriage assembly of the baseplate assembly 63 and is allowed to assume a natural rest position. The lever assembly 5 is lowered to the closed position.

A pressure differential is then created between the vacuum chuck 12 and the atmosphere. This pressure differential operates to hold the actuator lens against the vacuum chuck 12, while maintaining the orientation of the actuator lens. Additionally, the optical center of the actuator lens is maintained at the intersection point 40. This optical center may also be substantially at the center of mass of the actuator lens.

An adjustable power supply is attached to the radiant energy source within the optics module assembly 66. The radiant energy source projects a lens alignment beam of radiant energy into the carriage assembly. Within the carriage assembly, the lens alignment beam passes through the penta prism and through the actuator lens. The lens alignment beam then passes through the substrate 20, through the microscope objective lens 19, and into the tower assembly 1, where the lens alignment beam passes through the tower magnifying lens 6 and is received by the video camera 7. The analysis assembly 9 then displays and analyzes the spot profile of the lens alignment beam.

If the lens alignment beam is not received by the video camera 7 and passed to the analysis assembly 9, the X-axis lateral alignment actuator 21 and the Y-axis lateral alignment actuator 22 are used to move the microscope objective lens 19 laterally with respect to the tower assembly 1. The X-axis lateral alignment actuator 21 and the Y-axis lateral alignment actuator 22 may be alignment actuators 41 as shown in exemplary FIG. 8.

If the lens alignment beam is not focussed properly in the video camera 7 and analysis assembly 9, the focus actuator 23 is used to move the microscope objective lens 19 toward or away from the tower assembly 1 until the lens alignment beam is in proper focus within the video camera 7 and analysis assembly 9. The focus actuator 23 may be an alignment actuator 41 as shown in exemplary FIG. 8.

Once focussed properly, the analysis assembly 9 analyzes the profile of the beam for coma and astigmatism, as the cradle alignment beam was previously analyzed. If these optical aberrations occur, the actuator lens tilt assembly 15 operates to minimize these aberrations by aligning the actuator lens. As described above, the X-axis tilt actuator 32 rotates the actuator lens about the X-axis. Likewise, the Y-axis tilt actuator 33 rotates the actuator lens about the Y-axis. Together, the actuator lens tilt assembly 15 can rotate the actuator lens in any direction with respect to the lens alignment beam, while maintaining the optical center or the center of mass of the actuator lens at the intersection point 40.

Once the misalignment is corrected to within an acceptable tolerance, the gripper assembly 2, including the vacuum chuck 12 and the actuator lens, is raised to the open position. A fastening agent is placed on the pedestals of the carriage assembly, and the gripper assembly 2 is again lowered to the closed position. The actuator lens is secured by the fastening agent to the carriage assembly, without changing the orientation of the actuator lens established by the actuator lens tilt assembly 15. The fastening agent may be a selectably-curable adhesive, such as ultraviolet radiation-curable adhesive.

Once the fastening agent has cured, the actuator lens is tested for alignment. As above, a lens alignment beam is radiated through the actuator lens, the substrate 20, the microscope objective lens 19, the tower magnifying lens 6, and into the video camera 7. The analysis assembly 9 then analyzes the spot profile of the lens alignment beam. Each of the alignments described above may need to be adjusted for this testing process. Depending on its configuration, the vacuum chuck 12 may need to be retracted or removed to avoid contacting and damaging the carriage assembly.

In another embodiment of the invention, the cradle assembly 3 may comprise a plurality of cradles 47, a plurality of vacuum clamps 50, and a baseplate alignment assembly (not shown). The cradles 47 may be movable with respect to the tower assembly 1, and there may be either one baseplate alignment assembly (not shown) for each cradle 47, or a single baseplate alignment assembly (not shown) which aligns only the cradle 47 presently in position with respect to the tower assembly 1. Further, there may be a single source of radiant energy 54 and set of actuators 55, 56, 57, 58 regardless of the number of cradles 47, with one mirror 59 associated with each cradle 47.

According to this embodiment, there may be a second tower assembly 1 identical to the first tower assembly 1 described above. In addition, there may be a second gripper assembly 2 associated with the second tower assembly 1 as described above. The second gripper assembly 2 will not contain a vacuum chuck 12.

In operation, the first tower assembly 1 and first gripper assembly 2 operate as described in the previous embodiment. After fastening the actuator lens to the carriage assembly with the fastening agent, the cradle 47 containing the baseplate assembly 63 is moved beneath the second tower assembly 1 and second gripper assembly 2. Again, a lens alignment beam of radiant energy is projected by the optics module assembly 66 through the same path in the second tower assembly 1 and second gripper assembly 2 as described with respect to the first tower assembly 1 and first gripper assembly 2. The analysis assembly 9 associated with the second tower assembly 1 analyzes the spot profile of the lens alignment beam after the actuator lens is fastened to the baseplate assembly 63. It will be obvious to one skilled in the art that, by allowing the vacuum chuck 12 to be removable or retractable, the first tower assembly 1 and first gripper assembly 2 may function as the second tower assembly 1 and second gripper assembly 2, respectively.

It will be obvious to one skilled in the art that modifications to the above description of the invention may be made without departing from the spirit and scope of the invention. The scope of the invention, therefore, is indicated by the appended claims rather than the above description.

While this invention has been explained with reference to the structure disclosed herein, it is not confined to the details set forth and this application is intended to cover any modifications and changes as may come within the scope of the following claims:

What is claimed is:

1. A method for mounting an actuator lens to a carriage assembly, the method comprising the steps of:

positioning the carriage assembly in a baseplate assembly;

moving the baseplate assembly with respect to a tower assembly; moving a gripper assembly with respect to the tower assembly;

moving the actuator lens with respect to the tower assembly, wherein the baseplate, gripper and actuator lens respectively, define a baseplate optical axis, a gripper optical axis and actuator lens optical axis, and whereby the baseplate gripper assembly and actuator lens optical axes are aligned with said tower optical axis;

placing the baseplate assembly in a cradle assembly;

adjusting the focus of the actuator lens;

moving the gripper to an open position out of the tower optical axis;

applying a fastening agent to said carriage assembly; and lowering said gripper to a closed position, whereby said actuator lens is secured to said carriage assembly by said fastening agent without changing the orientation of the actuator lens.

2. A method, as defined in claim 1, wherein the step of moving the baseplate comprises:

moving said baseplate assembly with respect to said tower assembly laterally such that said baseplate optical axis and said tower optical axis intersect at a first intersection; and rotating a first time said baseplate assembly with respect to said tower assembly about a first rotational axis through said first intersection and orthogonal to said baseplate optical axis and said tower optical axis.

3. A method, as defined in claim 2, wherein said step of moving the actuator lens comprises:

moving said actuator lens with respect to said tower assembly laterally such that said actuator lens optical axis and said tower optical axis intersect at a second intersection; and rotating a second time said actuator lens with respect to said tower assembly about a second rotational axis through said second intersection and orthogonal to said actuator lens optical axis and said tower optical axis.

4. A method, as defined in claim 3, wherein said first rotating step comprises:

rotating said baseplate assembly with respect to said tower assembly about a first reference axis through said first intersection and coplanar with said first rotational axis; and rotating said baseplate assembly with respect to said tower assembly about a second reference axis through said first intersection and coplanar with said first rotational axis and orthogonal to said first reference axis;

whereby said baseplate assembly is rotated about said first rotational axis; and said second rotating step comprises:

rotating said actuator lens with respect to said tower assembly about a third reference axis through said second intersection and coplanar with said first rotational axis; and rotating said actuator lens with respect to said tower assembly about a fourth reference axis through said second intersection and coplanar with said second rotational axis and orthogonal to said third reference axis;

whereby said actuator lens is rotated about said second rotational axis.

5. A method, as defined in claim 2, wherein said first rotating step comprises:

rotating said baseplate assembly with respect to said tower assembly about a first reference axis through said first intersection and coplanar with said first rotational axis; and rotating said baseplate assembly with respect to said tower assembly about a second reference axis through said first intersection and coplanar with said first rotational axis and orthogonal to said first reference axis;

whereby said baseplate assembly is rotated about said first rotational axis.

6. A method, as defined in claim 1, wherein said step of moving the actuator lens comprises:

moving said actuator lens with respect to said tower assembly laterally such that said actuator lens optical axis and said tower optical axis intersect at a second intersection; and rotating a second time said actuator lens with respect to said tower assembly about a second rotational axis through said second intersection and orthogonal to said actuator lens optical axis and said tower optical axis.

7. A method, as defined in claim 6, wherein said second rotating step comprises:

rotating said actuator lens with respect to said tower assembly about a third reference axis through said second intersection and coplanar with said first rotational axis; and rotating said actuator lens with respect to said tower assembly about a fourth reference axis through said second intersection and coplanar with said second rotational axis and orthogonal to said third reference axis;

whereby said actuator lens is rotated about said second rotational axis.

8. A method for installing an actuator lens into an optical disc carriage assembly, the carriage assembly including an information bearing disc having a spindle, spindle motor, and optics module; the method comprising:

moving a first time a baseplate assembly with respect to a tower assembly, said baseplate assembly defining a baseplate optical axis, said tower assembly defining a tower optical axis, whereby said first moving step aligns said baseplate optical axis and said tower optical axis;

moving a second time an objective lens assembly with respect to said tower assembly, said objective lens assembly defining an objective lens optical axis, whereby said second moving step aligns said objective lens optical axis and said tower optical axis;

moving a third time said actuator lens with respect to said tower assembly, said actuator lens defining an actuator lens optical axis, whereby said third moving step aligns said actuator lens optical axis and said tower optical axis;

mounting the carriage assembly in said baseplate assembly;

mounting the baseplate assembly on a cradle assembly, the cradle assembly having a source of radiant energy, an analyzer and a mirror;

positioning the gripper assembly in a closed position over the carriage assembly;

determining the tilt of the optical disc;

correcting the tilt of the disc;

aligning the cradle assembly with respect to a tower optical axis;

removing the optical disc from the baseplate assembly;

positioning the gripper assembly in an open position out of the tower optical axis;

placing the actuator lens in the carriage assembly;

lowering the gripper assembly to the closed position;

temporarily securing the actuator lens to the gripper assembly while maintaining the same orientation;

projecting a lens alignment beam into the carriage assembly, through the actuator lens, and through the gripper assembly to the tower assembly, the tower assembly including an optical analyzer;

analyzing the lens alignment beam;

aligning the actuator lens in response to the analysis;

moving the gripper assembly to the open position;

applying a fastening agent to the carriage assembly;

lowering the gripper to a closed position, whereby the lens is secured to the carriage assembly without changing the orientation established thereof and;

releasing the actuator lens from the gripper assembly.

9. A method, as defined in claim 8, wherein the gripper assembly includes a microscope objective lens and substrate.

10. A method, as defined in claim 8, wherein the step of projecting a lens alignment beam is followed by the step of analyzing the alignment of the actuator lens using the analyzer and adjusting the X-Y position of the baseplate in response thereto.

11. A method, as defined in claim 10, comprising the step of:

moving the microscope objective lens toward or away from the tower assembly until the lens alignment beam is in proper focus.

12. A method of installing an actuator as defined in claim 8, wherein the step of analyzing the lens alignment beam comprises the steps of: analyzing the focus using the analyzer; and moving the microscope objective lens in response thereto.

13. A method, as defined in claim 8, wherein the step of analyzing the lens alignment beam comprises the step of analyzing the lens alignment beam for coma and astigmatism and aligning the actuator lens in response thereto.

14. A method, as defined in claim 8, wherein the step of analyzing the alignment beam includes the steps of:

receiving the lens alignment beam in a video camera and in an analysis assembly contained in the tower; and adjusting a microscope objective toward or away from the tower until the lens alignment beam is in proper focus.

15. A method, as defined in claim 8, wherein the carriage assembly includes one or more pedestals, and wherein the step of applying a fastening agent includes the step of applying a fastening agent to the pedestal.

16. A method, as defined in claim 8, wherein the first moving step comprises:

moving the baseplate assembly with respect to the tower assembly laterally such that the baseplate optical axis and the tower optical axis intersect at a first intersection; and rotating a first time the baseplate assembly with respect to the tower assembly about a first rotational axis through the first intersection and orthogonal to the baseplate optical axis and the tower optical axis.

17. A method, as defined in claim 16, wherein the first rotating step comprises:

rotating the baseplate assembly with respect to the tower assembly about a first reference axis through the first intersection and coplanar with the first rotational axis; and rotating the baseplate assembly with respect to the tower assembly about a second reference axis through the first intersection and coplanar with the first rotational axis and orthogonal to the first reference axis;

whereby the baseplate assembly is rotated about the first rotational axis.

18. A method, as defined in claim 8, wherein the third moving step comprises:

moving the actuator lens with respect to the tower assembly laterally such that the actuator lens optical axis and the tower optical axis intersect at a second intersection; and rotating a second time the actuator lens with respect to the tower assembly about a second rotational axis through the second intersection and orthogonal to the actuator lens optical axis and the tower optical axis.

19. A method, as defined in claim 18, wherein the second rotating step comprises:

rotating the actuator lens with respect to the tower assembly about a third reference axis through the second intersection and coplanar with the first rotational axis; and rotating the actuator lens with respect to the tower assembly about a fourth reference axis through the second intersection and coplanar with the second rotational axis and orthogonal to the third reference axis;

whereby the actuator lens is rotated about the second rotational axis.

20. A method, as defined in claim 8, wherein the third moving step comprises:

moving the actuator lens with respect to the tower assembly laterally such that the actuator lens optical axis and the tower optical axis intersect at a second intersection; and rotating a second time the actuator lens with respect to the tower assembly about a second rotational axis through the second intersection and orthogonal to the actuator lens optical axis and the tower optical axis.

21. A method of aligning a lens, as defined in claim 8, wherein the first rotating step comprises:

rotating the baseplate assembly with respect to the tower assembly about a first reference axis through the first intersection and coplanar with the first rotational axis; and rotating the baseplate assembly with respect to the tower assembly about a second reference axis through the first intersection and coplanar with the first rotational axis and orthogonal to the first reference axis;

whereby the baseplate assembly is rotated about the first rotational axis; and the second rotating step comprises:

rotating the actuator lens with respect to the tower assembly about a third reference axis through the second intersection and coplanar with the first rotational axis; and rotating the actuator lens with respect to the tower assembly about a fourth reference axis through the second intersection and coplanar with the second rotational axis and orthogonal to the third reference axis;

whereby the actuator lens is rotated about the second rotational axis.

22. A method as defined in claim 8 wherein the step of adjusting the focus of the actuator lens comprises the steps of:

directing a beam of radiant energy from source, through the actuator lens, and to an optical analyzer in the tower; and analyzing the focus of the beam received by the analyzer; and adjusting the position of the gripper in response to the analysis.

23. The method as defined in claim 8 wherein the step of correcting the tilt further comprises the steps of:

directing two cradle alignment beams, from the cradle assembly radiant energy source, the first beam being directed to the mirror, to the optical disc, and to the alignment analyzer;

the second beam being directed to the mirror, the gripper and to the alignment analyzer; and comparing the relative position of the first and second beams on the alignment analyzer and adjusting the position of the cradle in response thereto.

24. An apparatus for installing an actuator lens in a carriage assembly, the actuator lens defining as actuator optical axis and an actuator optical center within a baseplate using a beam of radiant energy, comprising:

a frame;

a cradle assembly for holding the baseplate, the cradle assembly mounted to the frame with at least one degree of freedom of motion; the carriage assembly, being mounted to the baseplate, the carriage assembly including an optical disc, and spindle motor and pedestal for holding the actuator lens;

a tower assembly defining a tower axis and mounted to the frame, the cradle assembly and the tower assembly defining an assembly axis for receiving the beam of radiant energy along the tower axis and analyzing the spot profile of the beam of radiant energy;

a lever assembly positioned in a closed position, rotatably mounted to the frame; and a gripper assembly mounted to the lever assembly, comprising:

an objective lens defining an objective optical axis;

an objective lens assembly mounted to the objective lens, for selectively holding the actuator lens stationary relative to the objective lens;

an objective lens alignment assembly for aligning the objective lens with the tower assembly and the cradle assembly by aligning the objective optical axis laterally with respect to the assembly axis when the lever assembly is in the closed position; and an actuator lens tilt assembly for aligning the actuator lens with the tower assembly and the cradle assembly by rotating the actuator optical axis about an axis orthogonal to the assembly axis when lever assembly is in the closed position;

whereby when the lever assembly is in the closed position the gripper assembly, the tower assembly, the cradle assembly, the baseplate, and the actuator lens tilt assembly are positioned with respect to each other such that the beam of radiant energy can be used to align the actuator lens with the baseplate by adjusting the relative position of alignment of one or more of the objective lens assembly, the cradle assembly and the actuator lens with respect to the tower assembly, and whereby when the lever assembly is in the open position and the actuator lens is removed, and a fastening agent is applied to the pedestal, when the lever assembly is closed the actuator lens is secured by the fastening agent without changing the alignment of the actuator lens.

25. An apparatus as defined in claim 24, further comprising:

a source of radiant energy for projecting the beam of radiant energy into the tower assembly along a beam axis;

means for determining the tilt alignment of the beam axis with respect to the tower axis;

a first tilt actuator for rotating the beam axis about a first repositioning axis orthogonal to the tower axis; and a second tilt actuator for rotating the beam axis about a second repositioning axis orthogonal to the tower axis and the first repositioning axis.

26. An apparatus as defined in claim 24, further comprising:
- a source of radiant energy for projecting the beam of radiant energy into the tower assembly along a beam axis;
- means for determining the lateral alignment and tilt alignment of the beam axis with respect to the tower axis;
- a first lateral actuator for repositioning the beam axis laterally with respect to the tower axis along a first repositioning axis orthogonal to the tower axis;
- a second lateral actuator for repositioning the beam axis laterally with respect to the tower axis along a second repositioning axis orthogonal to the tower axis and the first repositioning axis;
- a first tilt actuator for rotating the beam axis about the first repositioning axis; and
- a second tilt actuator for rotating the beam axis about the second repositioning axis.

27. An optical disc drive system having a carriage assembly with an actuator lens mounted therein by the method according to claim 1, 8 or 24.

28. A method for installing an actuator lens into an optical disc carriage assembly, the carriage assembly including an information bearing disc having a spindle, spindle motor and optics module; the method comprising:
- moving a first time said baseplate assembly with respect to a tower assembly, said baseplate assembly defining a baseplate optical axis, said tower assembly defining a tower optical axis, whereby said first moving step aligns said baseplate optical axis and said tower optical axis;
- moving a second time an objective lens assembly with respect to said tower assembly, said objective lens assembly defining an objective lens optical axis, whereby said second moving step aligns said objective lens optical axis and said tower optical axis; and
- moving a third time said actuator lens with respect to said tower assembly, said actuator lens defining an actuator lens optical axis, whereby said third moving step aligns said actuator lens optical axis and said tower optical axis;
- positioning the carriage assembly in a baseplate assembly;
- positioning the baseplate assembly on a cradle assembly, the cradle assembly having a source of radiant energy and a mirror;
- positioning the gripper assembly in a closed position over the carriage assembly determine the tilt of the optical disc;
- correcting the tilt of the disc;
- aligning the cradle assembly with respect to a tower optical access;
- removing the optical disc from the baseplate assembly;
- positioning the gripper assembly in an open position out of the tower optical access;
- placing the actuator lens in the carriage assembly;
- lowering the gripper assembly to the closed position;
- temporarily securing the actuator lens to the gripper assembly while maintaining the same orientation;
- project a light beam into the carriage assembly and through the actuator lens, and through the gripper assembly to the tower assembly, the tower assembly including an optical analyzer;
- analyzing the lens alignment beam (add lens above);
- aligning the actuator lens in response to the analysis;
- moving the gripper assembly to the open position;
- applying a fastening agent to the carriage assembly;
- lowering the gripper to a closed position, where by the lens is secured to the carriage assembly without changing the orientation established thereof.

* * * * *

UNITED STATES PATENT AND TRADEMARK OFFICE
CERTIFICATE OF CORRECTION

PATENT NO. : 5,768,035  Page 1 of 2
DATED : June 16, 1998
INVENTOR(S) : Grassens, et al It is certified that error appears in the above-identified patent and that said Letters Patent is hereby corrected as shown below:

On the title page, under item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 6 | 3 | 8 | 9 | 3 | 3 | 2/1/72 | Burnette et al. | | | |
| | | 4 | 6 | 5 | 2 | 0 | 9 | 5 | 3/24/87 | Mauro | | | |
| | | 4 | 7 | 7 | 2 | 1 | 0 | 9 | 9/20/88 | Cutburth et al. | | | |
| | | 4 | 9 | 1 | 3 | 5 | 2 | 7 | 4/3/90 | Jessop | | | |
| | | 3 | 4 | 0 | 0 | 5 | 9 | 7 | 9/10/68 | Nater | | | |
| | | 4 | 7 | 7 | 2 | 1 | 2 | 3 | 9/20/88 | Radner | | | |
| | | 5 | 0 | 7 | 9 | 6 | 4 | 1 | 1/7/92 | Marino et al. | | | |
| | | | | | | | | | | | | | |

UNITED STATES PATENT AND TRADEMARK OFFICE
CERTIFICATE OF CORRECTION

PATENT NO. : 5,768,035
DATED : June 16, 1998
INVENTOR(S) : Grassens, et al

It is certified that error appears in the above-identified patent and that said Letters Patent is hereby corrected as shown below:

FOREIGN PATENT OR PUBLISHED FOREIGN PATENT APPLICATION

|   |   | DOCUMENT NUMBER |   |   |   |   | PUBLICATION DATE | COUNTRY OR PATENT OFFICE | CLASS | SUBCLASS | TRANSLATION YES | NO |
|---|---|---|---|---|---|---|---|---|---|---|---|---|
|   | 5 | 8 | 16 | 8 | 0 | 2 | 1 | 10/4/83 | Japan |   |   |   |   |
|   | 6 | 0 | 25 | 6 | 1 | 0 | 8 | 12/17/85 | Japan |   |   |   |   |
|   | 1 | 9 | 6 | 1 | 9 | 1 | 3 | 7/1/71 | Germany |   |   |   |   |
|   | 4 | 0 | 3 | 8 | 7 | 2 | 7 | 6/11/92 | Germany |   |   |   |   |
|   | 5 | 9 | 2 | 7 | 6 | 6 |   | 4/20/94 | Europe |   |   |   |   |
|   | 1 | 0 | 9 | 7 | 8 | 3 | 2 | 4/17/89 | Japan |   |   |   |   |
|   | 5 | 9 | 1 | 0 | 7 | 30 | 7 | 6/21/84 | Japan |   |   |   |   |
|   | 6 | 0 | 1 | 9 | 7 | 94 | 2 | 10/7/85 | Japan |   |   |   |   |
|   | 6 | 3 | 1 | 0 | 3 | 93 | 2 | 5/9/88 | Japan |   |   |   |   |

Signed and Sealed this

Second Day of March, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,768,035
DATED : June 16, 1998
INVENTOR(S) : Leonardus J. Grassens, et al.

It is certified that error appears in the above-identified patent and that said Letters Patent is hereby corrected as shown below:

Title page,
Item [54], delete "METHOD AND APPARATUS FOR ALIGNING AN OBJECTIVE LENS" and in place thereof insert -- METHOD AND APPARATUS FOR MOUNTING A LENS -- (in Amendment filed October 23, 1997 as well as in COMMUNICATION -- Entry of Modified Title -- filed February 18, 1998)

Item [73], add -- Assignee: Discovision Associates, Irvine, Calif. --

Item [62], delete "410,698" and in place thereof insert, -- 418,698 --
(according to Filing Receipt from USPTO received February 25, 1997)

Item [57] ABSTRACT: *Col. 2, line 15*
 *(Amendment filed October 23, 1997, page 2, line 12)* delete *"presentation"* and in place thereof, insert -- representation -- between *"displaying a"* and *"of a beam"*.

Signed and Sealed this

Thirtieth Day of October, 2001

*Attest:*

NICHOLAS P. GODICI
*Acting Director of the United States Patent and Trademark Office*

*Attesting Officer*